(12) United States Patent
Abeta et al.

(10) Patent No.: US 7,492,794 B2
(45) Date of Patent: Feb. 17, 2009

(54) CHANNEL ESTIMATION METHOD AND APPARATUS FOR MULTI-CARRIER RADIO TRANSMITTING SYSTEM

(75) Inventors: Sadayuki Abeta, Yokosuka (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 559 days.

(21) Appl. No.: 11/248,307

(22) Filed: Oct. 13, 2005

(65) Prior Publication Data

US 2006/0039331 A1 Feb. 23, 2006

Related U.S. Application Data

(62) Division of application No. 09/780,501, filed on Feb. 12, 2001.

(30) Foreign Application Priority Data

Feb. 23, 2000 (JP) .............................. 2000-046624
Mar. 22, 2000 (JP) .............................. 2000-081050

(51) Int. Cl.
*H04J 3/00* (2006.01)
(52) U.S. Cl. .................. 370/521; 370/480; 370/493
(58) Field of Classification Search ................ 370/310, 370/310.2, 314, 319, 320, 321, 330, 335, 370/342, 436, 437, 441, 442, 480, 482, 485, 370/493, 533, 521
See application file for complete search history.

(56) References Cited

U.S. PATENT DOCUMENTS

| | | | |
|---|---|---|---|
| 5,757,766 A | 5/1998 | Sugita | |
| 6,122,295 A | 9/2000 | Kato et al. | |
| 6,400,679 B1 | 6/2002 | Suzuki | |
| 6,768,713 B1 * | 7/2004 | Siala et al. | 370/203 |
| 6,985,434 B2 * | 1/2006 | Wu et al. | 370/208 |

(Continued)

FOREIGN PATENT DOCUMENTS

CN 11 69070 12/1997

(Continued)

OTHER PUBLICATIONS

L.K. Rasmussen, et al., Personal, Indoor and Mobile Radio Communications, XP-010209137, pp. 1111-1115, "A Unifying Discrete-Time Model for Direct Sequence and Multicarrier Variable Rate Broadband CDMA", Oct. 15-18, 1996.

(Continued)

*Primary Examiner*—Wing F. Chan
*Assistant Examiner*—Mark A. Mais
(74) *Attorney, Agent, or Firm*—Oblon, Spivak, McClelland, Maier & Neustadt, P.C.

(57) ABSTRACT

A multi-carrier CDMA radio transmitting method replicates each information symbol and disposes thus-obtained information symbols along a frequency axis, multiplies the thus-obtained information symbols with a spreading code along the frequency axis, spreads the information symbols into components of a plurality of sub-carriers having different frequencies. The transmission rate of the information is changed by controlling the amount of information transmitted simultaneously by controlling the number of the information symbols to be used for spreading for the plurality of sub-carrier components for each user to which the information is to be transmitted.

8 Claims, 20 Drawing Sheets

U.S. PATENT DOCUMENTS 7,099,299 B2 * 8/2006 Liang et al. ............ 370/342

FOREIGN PATENT DOCUMENTS

| | | |
|---|---|---|
| EP | 0 876 008 | 11/1998 |
| EP | 0 910 181 | 4/1999 |
| EP | 0 920 160 | 6/1999 |
| EP | 0 929 161 A2 | 7/1999 |
| EP | 0 961 511 | 12/1999 |
| EP | 0 964 529 | 12/1999 |
| EP | 1 014 609 | 6/2000 |
| GB | 2319 709 | 5/1998 |
| JP | 8 251 117 | 9/1996 |
| JP | 8 265 184 | 10/1996 |
| JP | 8 331 095 | 12/1996 |
| JP | 8 335 929 | 12/1996 |
| JP | 10 93650 | 4/1998 |
| JP | 10 145 245 | 5/1998 |
| JP | 10 507 333 | 7/1998 |
| JP | 11 275 164 | 10/1999 |
| WO | WO 97/05717 | 2/1997 |
| WO | WO 97/50206 | 12/1997 |
| WO | WO 98/40972 | 9/1998 |
| WO | WO 00/02326 | 1/2000 |
| WO | WO 00/03508 | 1/2000 |

OTHER PUBLICATIONS

S. Hara, IEEECommunications Magazine, XP-000858431, pp. 126-133, "Overview of Multicarrier CDMA", Dec. 1997.

A. Baier, et al., IEE European Conference on Mobile and Personal Communications, XP-000610288, pp. 255-260, "Multi-Rate DS-CDMA Radio Interface for Third-Generation Cellular Systems", Dec. 13-15, 1993.

M.-H. Hsieh, et al., IEEE Transactions on Consumer Electronics, vol. 44, No. 1, XP-000779270, pp. 217-225, "Channel Estimation for OFDM Systems Based on Comb-Type Pilot Arrangement in Frequency Selective Fading Channels" Feb. 1, 1998.

S. Abeta, et al., IEICE Technical Report, vol. 98, No. 21, XP-002929086, pp. 67-74, "The Performance of Channel Estimation Method Using Adaptive Weighted Multi-Symbol Averaging(WMSA) With Pilot Channel in DS-CDMA", Apr. 1998 ( with English Abstract ).

S. Cacopardi, et al., IEEE Vehicular Technology Conference, XP-010162655, pp. 1559-1563, "Channel Estimation and Tracking of an Indoor Orthogonal Multicarrier DS-CDMA System Using Measured Channel Delay Profiles", May 1, 1996.

* cited by examiner

SPREADING BY n/m

SUB-CARRIERS ASSIGNED TO INFORMATION BIT i

SUB-CARRIERS ASSIGNED TO INFORMATION BIT i

FIG.12
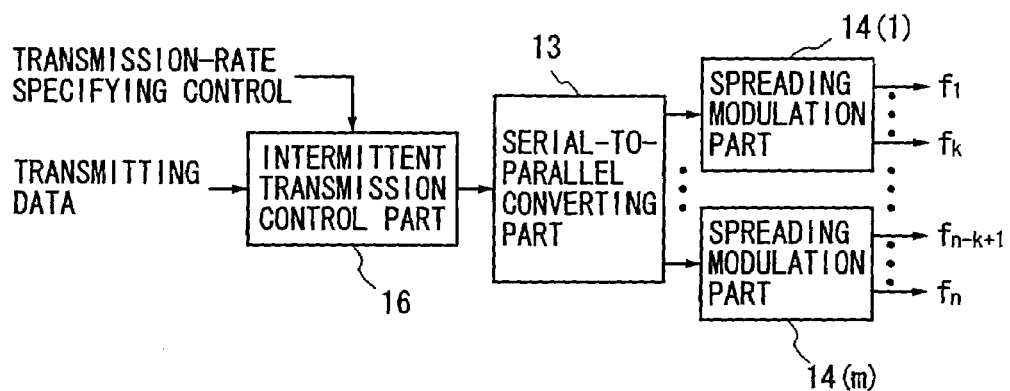
FIG.13A
FIG.13B
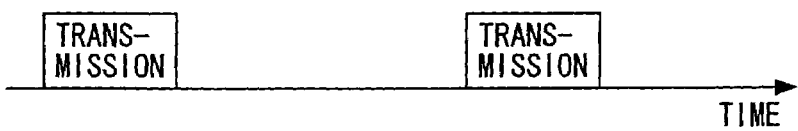
FIG.13C

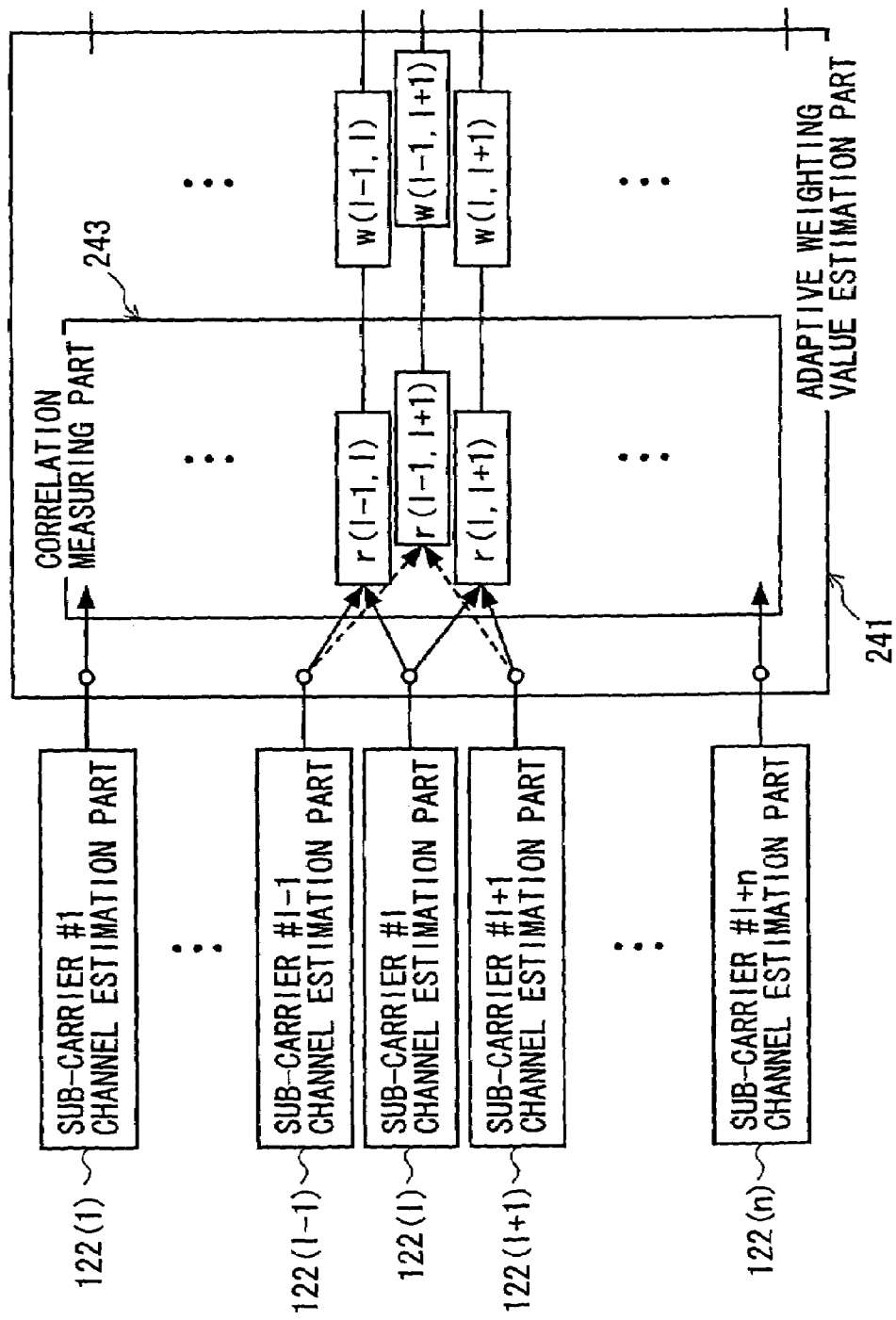

CHANNEL ESTIMATION METHOD AND APPARATUS FOR MULTI-CARRIER RADIO TRANSMITTING SYSTEM

CROSS-REFERENCES TO RELATED APPLICATIONS

This application is based upon and claims the benefit of priority under 35 U.S. C. §120 of allowed U.S. patent application Ser. No. 09/780,501, filed Feb. 12, 2001, the entire content of which is incorporated herein by reference.

BACKGROUND OF THE INVENTION

1. Field of the Invention

The present invention relates to multi-carrier CDMA (Code Division Multiple Access) radio transmitting method and apparatus, and channel estimation method and apparatus for a multi-carrier CDMA radio transmitting system such as a multi-carrier CDMA radio transmitting system, an orthogonal-frequency-division-multiplexing (OFDM) radio transmitting system or the like, and, in particular, to multi-carrier CDMA radio transmitting method and apparatus enabling transmission of information at various transmission rates, and channel estimation method and apparatus for a multi-carrier CDMA radio transmitting system by which a channel estimation value of each sub-carrier is adaptively controlled according to a state of the radio channel.

2. Description of the Related Art

Currently, a digital mobile communication system (such as a PDC (Personal Digital Cellular), GSM (Global System for Mobile communications, and so forth) for rendering communication service adopts a TDMA (Time Division Multiple Access) form in which a time slot is assigned for each user, and thereby communication is rendered. This form was designed mainly for providing voice communication service, and renders voice communication service rendering transmission of voice information at a fixed rate.

Further, with regard to application of a multi-carrier CDMA radio transmitting system to a digital mobile communication system, studies have been made recently. In the studies, discussion has been made mainly for accommodating more users (mobile stations) on condition that information is transmitted at a same transmission rate.

When considering transmission of multimedia information including image information (static images/pictures, dynamic images/pictures) and voice information, it is preferable to made the transmission rate of information variable depending on types of information to be transmitted, state of channel between a base station and a mobile station, information processing capability of a reception-side apparatus, and so forth.

The multi-carrier CDMA radio transmitting system employs a spread spectrum communication method in which an information symbol is multiplied by a spreading code for each user on a frequency axis. An analysis for information transmission at different transmission rates for the multi-carrier CDMA radio transmitting system rendering information transmission for each user by such a method has been made. However, no concrete method for this purpose has not been reported clearly.

In a mobile communication environment, amplitude variation and/or phase variation in a communication channel due to Rayleigh fading caused due to change in relative positional relationship between a mobile station and a base station occur. Therefore, it is necessary to identify a phase of a received signal by an absolute phase for each information symbol in a phase modulation form in which information is transmitted at a carrier phase.

For the above-described requirement, 'Pilot Signal Inserting Form for Multi-Carrier Modulating Form employing 16QAM (Yamashita, Hara, Morinaga: Spring Meeting of the Institute of Electronics, Information and Communication Engineers, B-256, pages 2-356, March, 1994)' and 'Discussion of Adapting Form for OFDM by using Pilot Symbol (Yamashita, Kuwabara, Itami, Itoh: General Meeting of the Institute of Electronics, Information and Communication Engineers, B-5-245, page 609, September, 1998)' propose a method of estimating and compensating fading distortion by using pilot symbols, the phases of which are known, inserted among appropriate plurality ones of all the sub-carriers and also among information symbols at fixed periods.

By this method, for example, as shown in FIG. 1, by using pilot symbols (●) inserted into a plurality of sub-carriers f1, f2, . . . at fixed periods, amplitudes and phases of received signals for respective users are measured, and the measured values are obtained through interpolation rendered two-dimensionally in the time-axis direction and sub-carrier direction (frequency direction), and, thereby, variations in transmission channel for information symbols are estimated. Then, based on this estimation result, phase rotations of data symbols are compensated, and coherent detection is rendered. In this method, in order to reduce power consumption due to insertion of pilot symbols, the technique of interpolation is used without inserting pilot symbols into all the sub-carriers on the supposition that correlation in channel variation between respective sub-carriers is very high, and variations in transmission channel for sub-carriers into which no pilot symbol is inserted are estimated (channel estimation).

However, when the information transmission rate is increased, and the occupied frequency band is widened, the correlation in variation in transmission channel between respective sub-carriers vary depending on delay amounts due to the influence of delayed wave (echo). Thereby, the correlation in variation between sub-carriers may be decreased. In such a case, it is not possible to estimate channel variation precisely by using a pilot symbol of a sub-carrier apart by several carries.

SUMMARY OF THE INVENTION

An object of the present invention is to provide multi-carrier CDMA radio transmitting method and apparatus enabling radio information transmission at variable transmission rates for respective users.

Another object of the present invention is to provide channel estimation method and apparatus for a multi-carrier CDMA radio transmitting system by which channel estimation with high accuracy can be rendered in a situation in which the state of radio channel varies variously.

A multi-carrier CDMA radio transmitting method, according to the present invention, of replicating each information symbol, disposing thus-obtained along a frequency axis, multiplying the thus-obtained information symbols by a spreading code along the frequency axis, thus spreading the information symbols along the frequency axis into components of a plurality of sub-carriers having different frequencies, and thus rendering multiplex transmission of the information, comprising the step of enabling a transmission rate of the information to be changed by controlling the amount of information transmitted simultaneously by controlling the number of the information symbols to be used in the spreading into the plurality of sub-carrier components for each user to which the information is to be transmitted.

In this method, as a result of the number of information symbols to be used in the spreading being controlled, the amount of information simultaneously transmitted to each user is controlled. The control is made such that, for a user to which information should be transmitted at a high transmission rate, the number of information symbols used in the spreading is large, but, for a user to which information should be transmitted at a low transmission rate, the number of information symbols used in the spreading is small.

When the number of information symbols to be used in the spreading into the plurality of sub-carrier components is controlled as mentioned above, each information symbol is replicated, and thus-obtained information symbols are multiplied by the spreading code along the frequency axis, and, thus, each information symbol is spread into the plurality of different sub-carrier components along the frequency axis. Then, these different sub-carrier components are multiplexed, and, then, a thus-obtained signal is transmitted as information for the corresponding user.

The number of information symbols to be used in the spreading, that is, the transmission rate of information, is determined according to the environment of the radio channels (expressed by transmission/reception levels, interference, error rates and so forth) and/or the types of information to be transmitted (static images, dynamic images, voice, and so forth), for example.

In order to reduce influence of the interference on other users when information symbols for respective users are obtained through demodulation from information obtained as a result of the information symbols for the respective users being spread by using the spreading codes and multiplexed, codes which are orthogonal with each other may be used as the spreading codes used for the spreading of the information symbols for the respective user.

In order to determine relationship between the number of information symbols and sub-carriers assigned for the spreading of the information symbols when the number of information symbols to be used in the spreading for each user are controlled, the number of sub-carriers assigned for the spreading of all the information symbols to be transmitted simultaneously may be fixed, and the number of sub-carriers assigned for the spreading of each information symbol may be controlled.

Further, the number of information symbols to be used in the spreading into the plurality of sub-carrier components may be in inverse proportion to the number of sub-carriers assigned for the spreading of each information symbol.

For the same purpose, the number of sub-carriers assigned for the spreading of each information symbol may fixed, and, according to the number of information symbols to be used in the spreading into the plurality of sub-carrier components, the number of sub-carriers assigned for the overall spreading of the number of information symbols may be controlled.

Further, in order to enable spreading and multiplexing of the information symbols, the number of which is in accordance with the transmission rate, even using the same group of sub-carriers for each of the respective users, a group of sub-carriers assigned for the spreading of each of all the information symbols to be transmitted simultaneously may be made same among the respective information symbols, and the spreading codes used for the respective information symbols may be made different.

A multi-carrier CDMA radio transmitting method, according to another aspect of the present invention, of replicating each information symbol, disposing thus-obtained along a frequency axis, multiplying thus-obtained information symbols by a spreading code along the frequency axis, thus spreading the information symbols along the frequency axis into components of a plurality of sub-carriers having different frequencies, and thus rendering multiplex transmission of the information, comprises the step of enabling a transmission rate of the information to be changed by controlling multiplex transmission intervals along a time axis for each user to which the information is to be transmitted.

In this method, multiplexed transmission of information is rendered intermittently, and, at this time, the intervals of the transmission are controlled so that the transmission rate is variable. Such a control is made that, for a user to which information is to be transmitted at a high transmission rate, each of the intervals of the multiplexed transmission of the information is short, but, for a user to which information is to be transmitted at a low transmission rate, each of the intervals of multiplexed transmission of the information is long.

A multi-carrier CDMA radio transmitting method, according to another aspect of the present invention, of replicating each information symbol and disposing thus-obtained information symbols along a frequency axis, multiplying the thus-obtained information symbols by a spreading code along the frequency axis, thus spreading the information symbols into components of a plurality of sub-carriers having different frequencies, and thus rendering multiplex transmission of the information, comprising the step of enabling a transmission rate of the information to be changed by controlling the number of modulation levels used when the information symbols to be spread are obtained through data modulation.

In this method, such a control is made that, for a user to which information is to be transmitted at a high transmission rate, the number of modulation levels used when information symbols to be spread are obtained through the data modulation is large, and, specifically, for example, a data modulation system in a 16QAM form, a 32QAM form or the like is used, but, for a user to which information is to be transmitted at a low transmission rate, the number of modulation levels used when information symbols to be spread are obtained through the data modulation is small, and, specifically, for example, a data modulation system in a QPSK form, a BPSK form, or the like is used.

Further, in order to make easier for a receiving side (user side) to obtain information bits for each user through demodulation from information in which information symbols for respective users were spread by using different sub-carriers and multiplexed, the respective sub-carriers assigned for the spreading of the information symbols may be orthogonal with each other along the frequency axis.

In order to enable removal of influence of interference between sub-carriers, the respective sub-carriers assigned for the spreading of the information symbols may have frequency characteristics such that the frequency spectra do not overlap between each adjacent sub-carriers.

The respective sub-carriers assigned for the spreading of each information symbol may be disposed either discretely or successively along the frequency axis.

A multi-carrier CDMA radio transmitting apparatus, according to the present invention, replicating each information symbol and disposing thus-obtained information symbols along a frequency axis, multiplying the thus-obtained information symbols by a spreading code along the frequency axis, thus spreading the information symbols into components of a plurality of sub-carriers having different frequencies, and thus rendering multiplex transmission of the information, comprises a transmission-rate control part controlling the amount of information transmitted simultaneously by controlling the number of the information symbols to be used in the spreading into the plurality of sub-carrier components for each user to which the information is to be transmitted.

A multi-carrier CDMA radio transmitting apparatus, according to another aspect the present invention, of replicating each information symbol and disposing thus-obtained information symbols along a frequency axis, multiplying the thus-obtained information symbols by a spreading code along the frequency axis, thus spreading the information symbols for components of a plurality of sub-carriers having different frequencies, and thus rendering multiplex transmission of the information, comprises an intermittent transmission control part controlling multiplex transmission intervals along a time axis for each user to which the information is to be transmitted.

A multi-carrier CDMA radio transmitting apparatus, according to another aspect the present invention, of replicating each information symbol and disposing thus-obtained information symbols along a frequency axis, multiplying the thus-obtained information symbols by a spreading code along the frequency axis, thus spreading the information symbols into components of a plurality of sub-carriers having different frequencies, and thus rendering multiplex transmission of the information, comprises a modulation level control part controlling the number of modulation levels used when the information symbols to be spread are obtained through data modulation.

Thereby, according to the present invention, because the amount of information to be transmitted within a predetermined time period is controlled for each user in a multi-carrier CDMA radio transmitting system, it is possible to render radio transmission of information at various transmission rates for respective users.

A channel estimation method, according to the present invention, used for a multi-carrier CDMA radio transmitting system rendering radio transmission using n sub-carriers, for rendering channel estimation for each sub-carrier, comprises the steps of:

a) separating a received signal having a frame configuration comprising the n sub-carrier components including m sub-carrier components into which pilot symbols are inserted, into the respective sub-carrier components, where m≦n;

b) then using the pilot symbols included in the sub-carrier components obtained through the separation, and rendering channel estimation so as to obtain individual channel estimation results for these sub-carriers; and c) rendering the channel estimation for the target sub-carrier based on the thus-obtained individual channel estimation results for the respective p sub-carriers and relationship between a channel state for the target sub-carrier and a channel state for each of the p sub-carriers, where p≦m.

The relationship between the channel state for the target sub-carrier and the channel state for each of the p sub-carriers may be determined fixedly to be one expected from frequency characteristics and/or the like for the target sub-carrier and the p sub-carriers. However, the relationship between the channel state for the target sub-carrier and the channel state for each of the p sub-carriers may be obtained adaptively based on the respective channel states, in standpoint that channel estimation having a higher accuracy can be rendered according to the channel states.

In order to provide a specific method of rendering channel estimation for the target sub-carrier, a configuration may be made such that:

weighting information is obtained based on the relationship between the channel state for the target sub-carrier and the channel state for each of the p sub-carriers; and the individual channel estimation results for the respective p sub-carriers are weighted by the weighting information and are combined so as to obtain the channel estimation result for the target sub-carrier.

In order to provide a specific method of obtaining, as mentioned above, the relationship between the channel state for the target sub-carrier and the channel state for each of the p sub-carriers adaptively based on the respective channel states, a configuration may be made such that the weighting information is obtained based on mutual correlation obtained based on the individual channel estimation result obtained for the target sub-carrier and the individual channel estimation result obtained for each of the p sub-carriers.

The individual channel estimation result for each sub-carrier indicates the state of transmission channel for the sub-carrier. Thereby, by obtaining the weighting information based on mutual correlation obtained based on these respective channel estimation results, the channel estimation result obtained for the target sub-carrier using the thus-obtained weighting information reflects the states of transmission channels for the respective sub-carriers.

A channel estimation apparatus, according to the present invention, used for a multi-carrier CDMA radio transmitting system rendering radio transmission using n sub-carriers, for rendering channel estimation for each sub-carrier, comprises:

a sub-carrier separating part separating a received signal having a frame configuration comprising the n sub-carrier components including m sub-carrier components into which pilot symbols are inserted, into the respective sub-carrier components, where m≦n;

an individual channel estimation part using the pilot symbols included in the sub-carrier components obtained by the sub-carrier separating part, and rendering channel estimation so as to obtain individual channel estimation results for these sub-carriers; and a channel estimation part rendering the channel estimation for the target sub-carrier based on the thus-obtained individual channel estimation results for the respective p sub-carriers and relationship between a channel state for the target sub-carrier and a channel state for each of the p sub-carriers, where p≦m.

Thus, according to the present invention, channel estimation for a target sub-carrier is rendered based on the individual channel estimation results for respective sub-carriers and relationship between the channel state of the target sub-carrier and the channel state of each of the respective sub-carriers. Accordingly, it is possible to render high-accuracy channel estimation in a situation in which the states of radio channels change variously.

Other objects and further features of the present invention will become more apparent from the following detailed description when read in conjunction with the accompanying drawings.

BRIEF DESCRIPTION OF THE DRAWINGS

FIG. 12 is a block diagram showing a fourth example of a configuration for transmission-rate control in the first embodiment of the present invention;

FIGS. 13A, 13B and 13C illustrate an example of control of the transmission rate in the fourth example shown in FIG. 12;

FIG. 24 is a block diagram showing a specific example of a configuration of an adaptive weighting value estimation part used in the channel estimation part in the demodulating apparatus shown in FIG. 21.

DETAILED DESCRIPTION OF THE PREFERRED EMBODIMENTS

Embodiments of the present invention will now be described based on the drawings.

Figure 1:
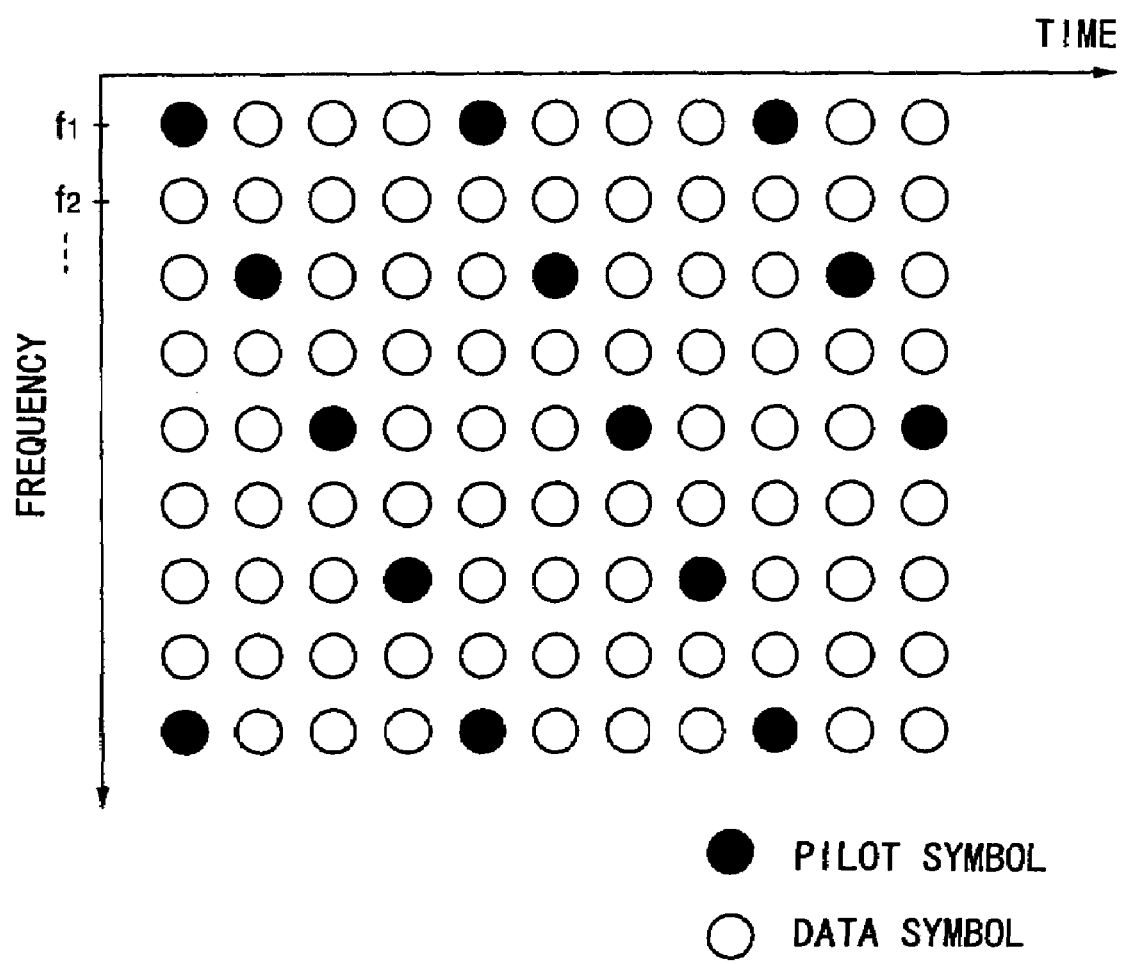
FIG. 1 illustrates an example in which pilot symbols are inserted, in a multi-carrier CDMA radio transmitting system in the related art.
Figure 2:
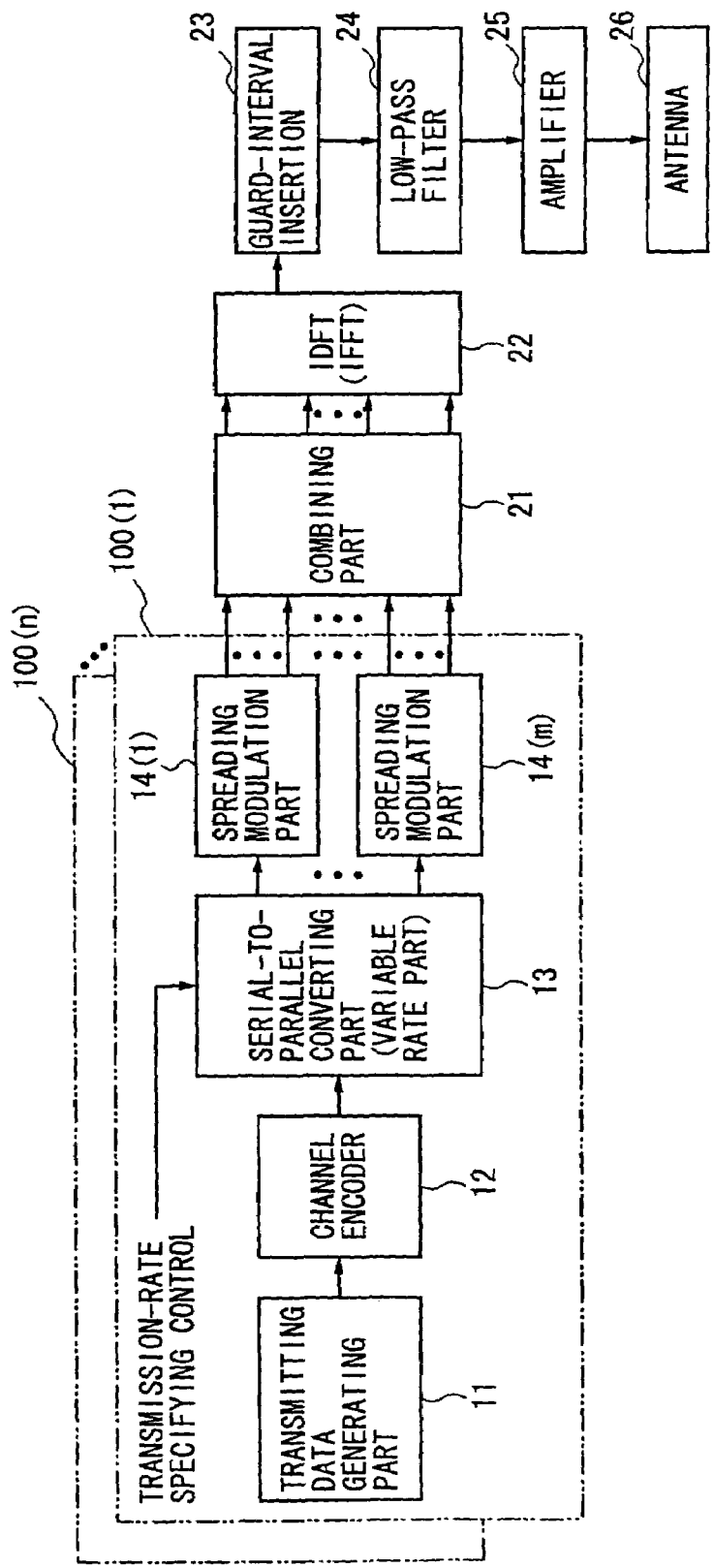
FIG. 2 is a block diagram showing a multi-carrier CDMA radio transmitting apparatus in a first embodiment of the present invention.

A multi-carrier CDMA radio transmitting apparatus in a first embodiment of the present invention has a configuration shown in FIG. 2, for example. This multi-carrier CDMA radio transmitting apparatus is employed in a base station of a digital mobile communication system, for example.

As shown in the figure, this multi-carrier CDMA radio transmitting apparatus has signal generating circuits $100(1)$ through $100(n)$ for respective users (mobile stations). The signal generating circuits $100(1)$ through $100(n)$ generate signals for the respective users, each of which includes a transmitting data generating part 11 generating transmitting data in a predetermined form from information (audio, data or the like) to be distributed to a respective user, a channel encoder 12 encoding the transmitting data from the transmitting data generating part 11 in accordance with a predetermined algorithm, a serial-to-parallel converting circuit 13 converting information symbols output from the channel encoder 12 in serial into parallel information symbols, and a plurality of spreading modulation parts $14(1)$ through $14(m)$ rendering spreading modulation along the frequency axis on the information symbols output in parallel from the serial-to-parallel converting circuit 13.

The serial-to-parallel converting circuit 13, based on a transmission-rate instruction control signal from a control unit (not shown in the figure), converts a series of information symbols input from the channel encoder 12 into a plurality of parallel series of information symbols. By controlling the number of series of information symbols obtained from this conversion, the amount of information transmitted simultaneously is controlled, and, as a result, the transmission rate of information is controlled.

To each of the plurality of spreading modulation parts $14(1)$ through $14(m)$, one of the respective series of information symbols output in parallel from the serial-to-parallel converting circuit 13 is input, and this series of information symbols undergoes spreading modulation along the frequency axis by using a spreading code. Although the m spreading modulation parts $14(1)$ through $14(m)$ are shown in FIG. 2, the number of spreading modulation parts out of the m spreading modulation parts same as the number of series of information symbols output in parallel from the serial-to-parallel converting circuit 13 are actually used.

Figure 3:
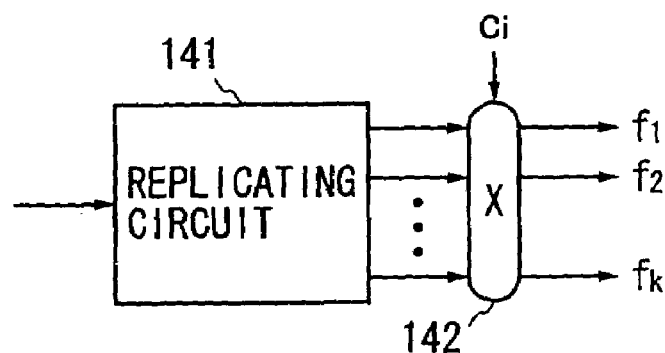
FIG. 3 is a block diagram showing a specific example of a configuration of each spreading modulation part shown in FIG. 2.

Each of the spreading modulation parts $14(1)$ through $14(m)$ is configured as shown in FIG. 3, for example. As shown in the figure, each of the spreading modulation parts $14(1)$ through $14(m)$ has a replicating circuit 141 and a multiplier 142. The replicating circuit 141 replicates the input information symbol by the number according to a spreading factor, and disposes thus-obtained information symbols along the frequency axis. The multiplier 142 multiplies each of the thus-obtained information symbols, disposed along the frequency axis, by a spreading code Ci assigned for each user (i) along the frequency axis. As a result, from the multiplier 142, spread signals of components corresponding to sub-carrier $f_1, f_2, \ldots, f_k$ along the frequency axis are output.

By the above-described configuration, each of the signal generating circuits $100(1)$ through $100(n)$ outputs the spread signals along the frequency axis obtained from multiplying the information symbols obtained through the replication by the spreading code, as a signal for a respective user. The spread signals corresponding to the respective users output from the respective signal generating circuits 100(1) through 100(n) are combined for each sub-carrier component by a combining part 21. The combined signal for each sub-carrier component from the combining part 21 undergoes frequency-to-time conversion by an IDFT (Inverse Discrete Fourier Transform) unit 22 (or an Inverse Fast Fourier Transform unit). By these combining part 21 and IDFT unit 22, a multi-carrier CDMA signal in which the information for the respective users are mixed is generated.

The multi-carrier CDMA signal in which the information for the respective users are thus multiplexed is processed by a guard-interval inserting part 23, a low-pass filter 24 and an amplifier 25, in sequence, and the thus-obtained signal is transmitted from an antenna unit 26.

In the above-described multi-carrier CDMA radio transmitting apparatus, the transmission rate of information is controlled as a result of the number of parallel series of information symbols obtained through conversion by the serial-to-parallel converting circuit 13 being controlled, as described above. Further detailed methods of this control of transmission rate will now be described.

Figure 4:
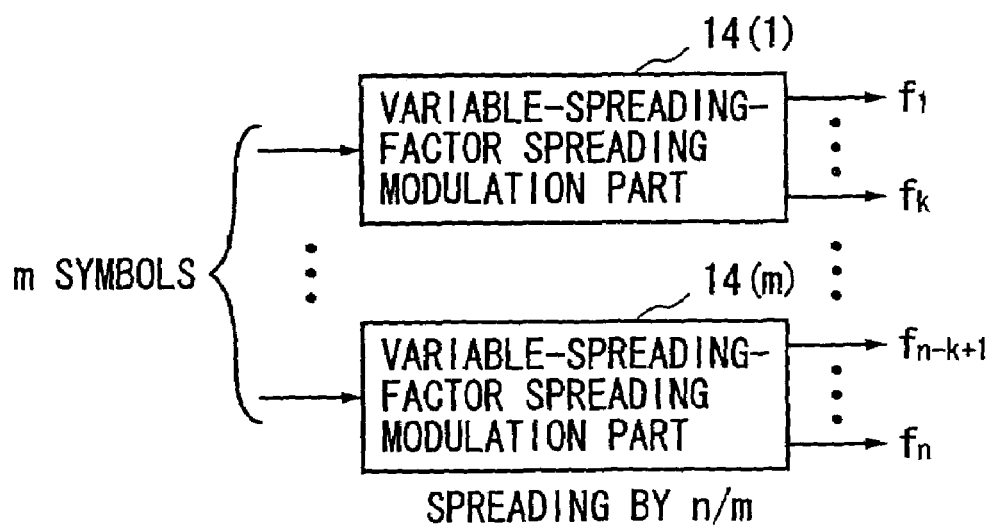
FIG. 4 is a block diagram showing a first example of a configuration for transmission-rate control in the first embodiment of the present invention.

In a first example, as shown in FIG. 4, each of the spreading modulation parts 14(1) through 14(m) is configured so that the spreading factor is variable.

In FIG. 4, when m information symbols are output from the serial-to-parallel converting circuit 13, each of the spreading modulation parts 14(1) through 14(m), to which a respective one of these m information symbols is input, renders a spreading process at a spreading factor of n/m (each of n and m is a natural number) on the input information symbol. That is, the input information symbol is replicated by the number k (=n/m), and, thus a one information symbol is spread into components corresponding to k sub-carriers along the frequency axis.

Figure 5A:
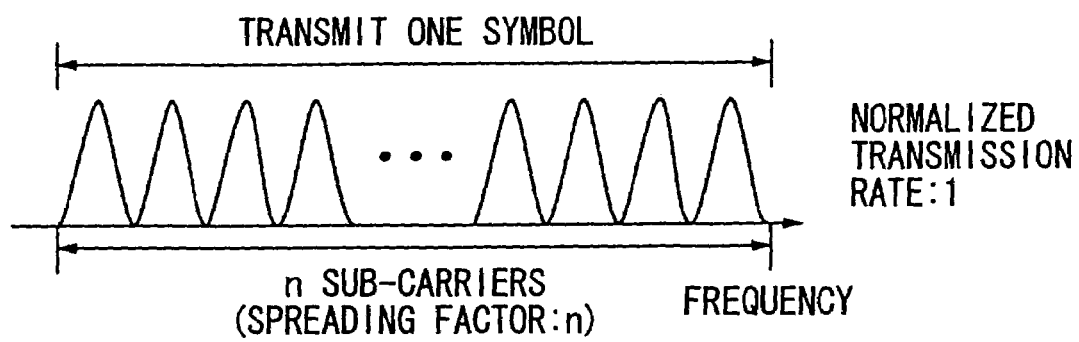
FIGS. 5A and 5B illustrate relationship between the transmission rate and the number of sub-carriers assigned for spreading of each information symbol in the first example shown in FIG. 4.
Figure 5B:
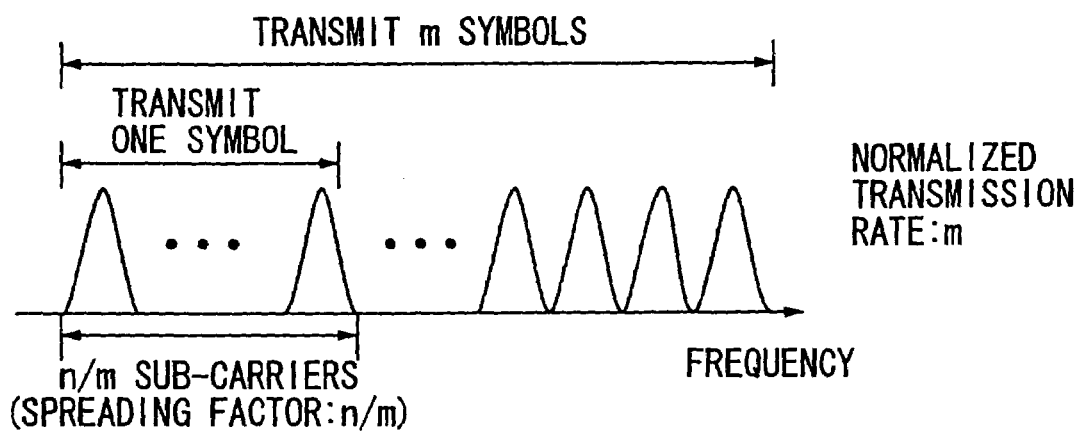

The spreading factor n/m varies in each of the spreading modulation parts 14(1) through 14(m) according to the number m of information symbols output in parallel from the serial-to-parallel converting circuit 13. In such a case, the relationship between the transmission rate and the number of sub-carriers assigned for spreading each information symbol is as shown in FIGS. 5A and 5B. Specifically, when m=1, that is, one information symbol is transmitted, as shown in FIG. 5A, the spreading factor of n, and the one information symbol is spread into components corresponding to n sub-carriers along the frequency axis. A normalized transmission rate in this case is assumed to be 1. Further, when m information symbols are transmitted simultaneously, as shown in FIG. 5B, the spreading factor is n/m, and each information symbol is spread into components corresponding to n/m sub-carriers along the frequency axis. Accordingly, the total number of sub-carriers assigned for spreading m information symbols is always a fixed value of n. In this case, the normalized transmission rate is m times the above-mentioned normalized transmission rate, and, thus, is m.

Figure 6A:
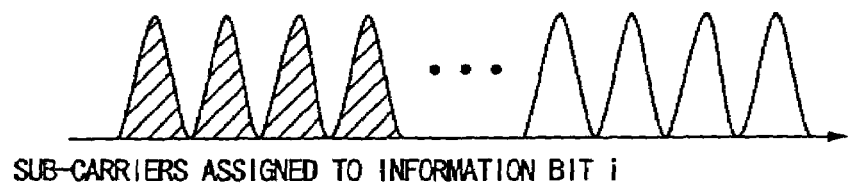
FIGS. 6A and 6B illustrate possible dispositions along the frequency axis of sub-carriers used for the spreading in the first embodiment of the present invention.
Figure 6B:
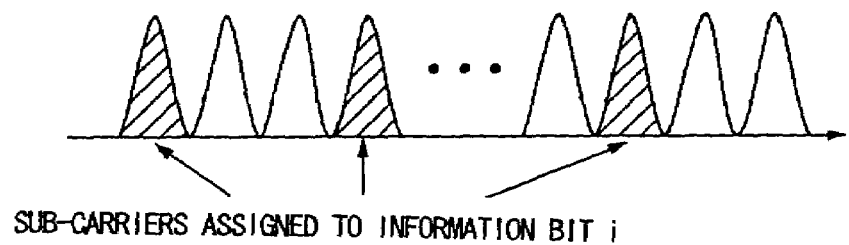

In the above-mentioned example, when the transmission rate is to be increased, the number of sub-carriers used for transmitting each information symbol is decreased. Conversely, when the transmission rate is to be decreased, the number of sub-carriers used for transmitting each information symbol is increased. Thus, the transmission rate is in inverse proportion to the number of sub-carriers used for transmitting each information symbol. Further, sub-carriers to be assigned for spreading each information symbol may be successive along the frequency axis as shown in FIG. 6A, or may be discrete along the frequency axis as shown in FIG. 6B.

In the above-mentioned example, because the spreading factor in each of the spreading modulation parts 14(1) through 14(n) varies so as to change the transmission rate, the period of the spreading code Ci used should be varied accordingly. Further, when the transmission rate is changed for each set of information required by a user, it is necessary to change the period of the spreading code Ci also for each user. Accordingly, when the transmission rate is controlled by the above-mentioned method, the spreading codes having various periods are used in the multi-carrier CDMA radio transmitting apparatus. In considering a process of decoding information symbols for each user on a receiving side, it is preferable that the respective spreading codes used have orthogonal relationship with each other.

Therefore, respective spreading codes used in the multi-carrier CDMA radio transmitting apparatus in such a case are determined so as to satisfy the following conditions.

When the spreading code Ci having the period of n×m is used for spreading information symbols for a user i into components of n×m sub-carriers, and the spreading code Ck having the period of n is used for spreading information symbols for a user k into components of n sub-carriers, the respective spreading codes Ci and Ck satisfy the following formulas:

$$\sum_{x=0}^{n} Ci(x) \times Ck(x) = 0 \quad \sum_{x=0}^{n \times m} Ci(x) \times Ck(x) = 0$$

Thereby, these spreading codes have orthogonal relationship with one another.

Figure 7:
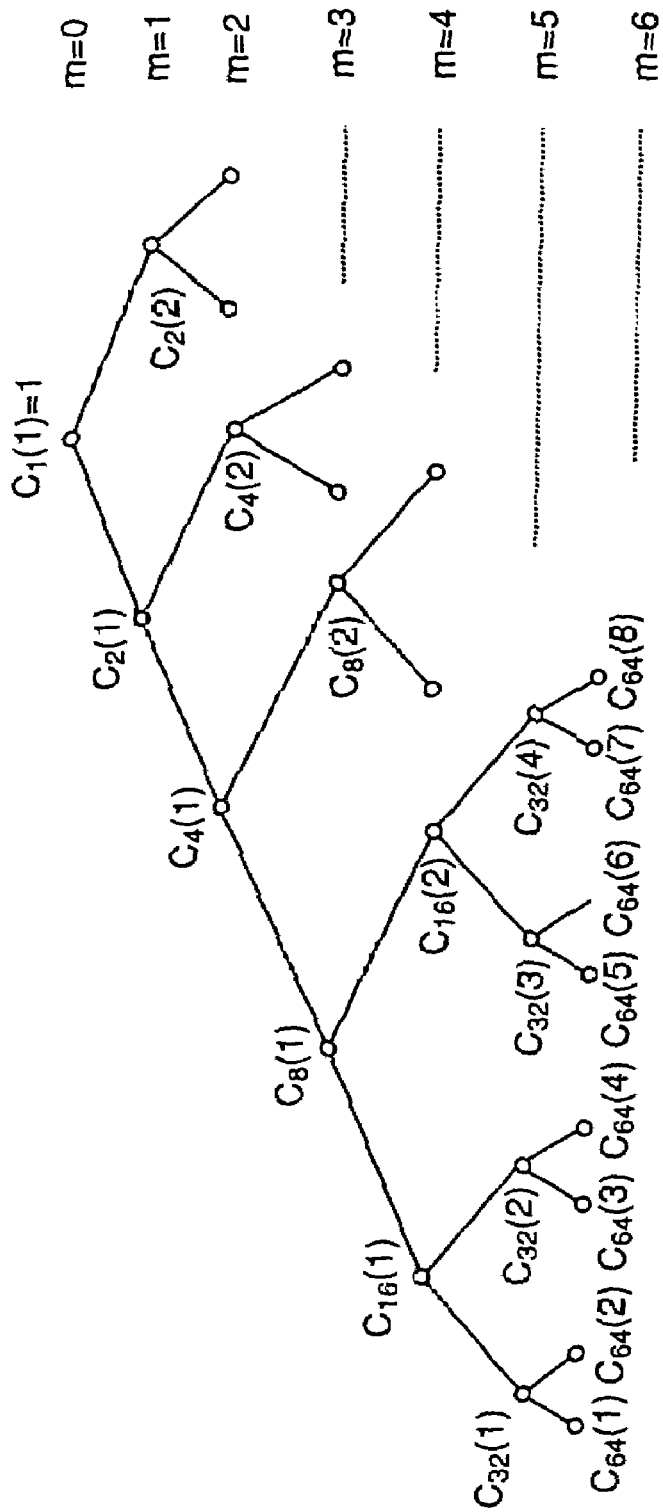
FIG. 7 shows one example of a technique of generating spreading codes having orthogonal relationship.

A technique for generating the spreading codes Ci and Ck is disclosed in 'Orthogonal forward link using orthogonal multi-spreading factor codes for DS-CDMA mobile radio (K. Okawa and F. Adachi: IEICE Trans. Commun., Vol. E81-B, No. 4, pages 777-784, April, 1998', for example. In such a technique, for example, as shown in FIG. 7, from spreading codes having respective periods ($2^m$ (m=1, 2, ...)) generated so as to be disposed hierarchically according to a Hadamard's series, spreading codes having predetermined positional relationship therebetween are selected as the spreading codes Ci and Ck having orthogonal relationship.

Figure 8:
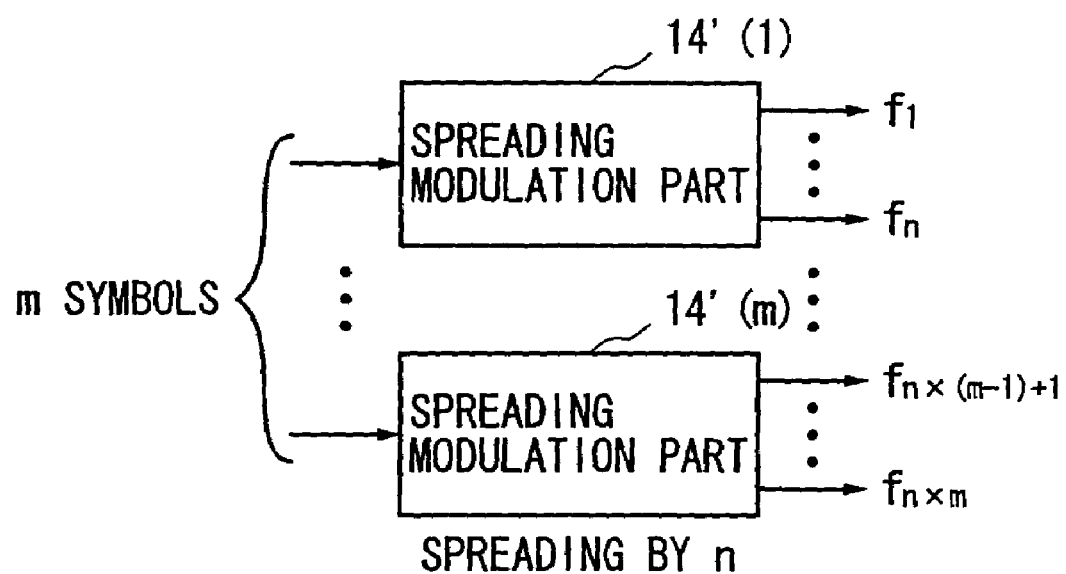
FIG. 8 is a block diagram showing a second example of a configuration for transmission-rate control in the second embodiment of the present invention.

In a specific technique in a second example of control of transmission rate, as shown in FIG. 8, each of the spreading modulation parts 14'(1) through 14'(m) is configured to render a spreading process using a fixed spreading factor.

As shown in FIG. 8, when m information symbols are output from the serial-to-parallel converting circuit 13 in parallel, each of the plurality of spreading modulation parts 14'(1) through 14'(m), to which a respective one of these m information symbols is input, renders a spreading process using a spreading factor of n on the input information symbol at any time. That is, the input information symbol is replicated by the number n, and, thus each information symbol is spread into components corresponding to n sub-carriers along the frequency axis at any time.

Figure 9A:
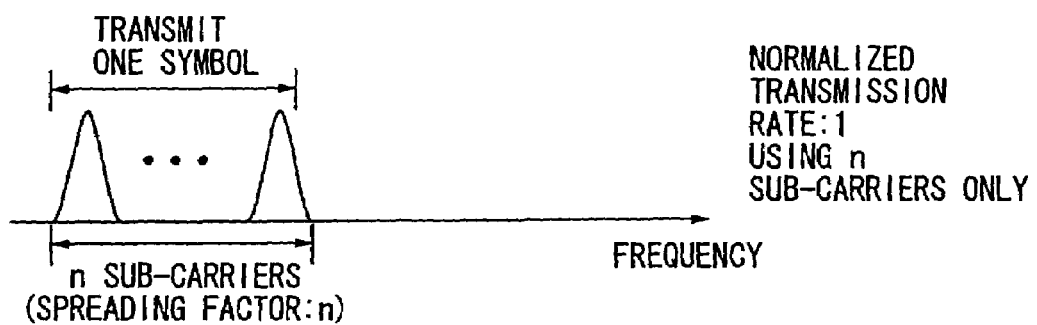
FIGS. 9A and 9B illustrate relationship between the transmission rate and the number of sub-carriers assigned for spreading of each information symbol in the second example shown in FIG. 8.
Figure 9B:
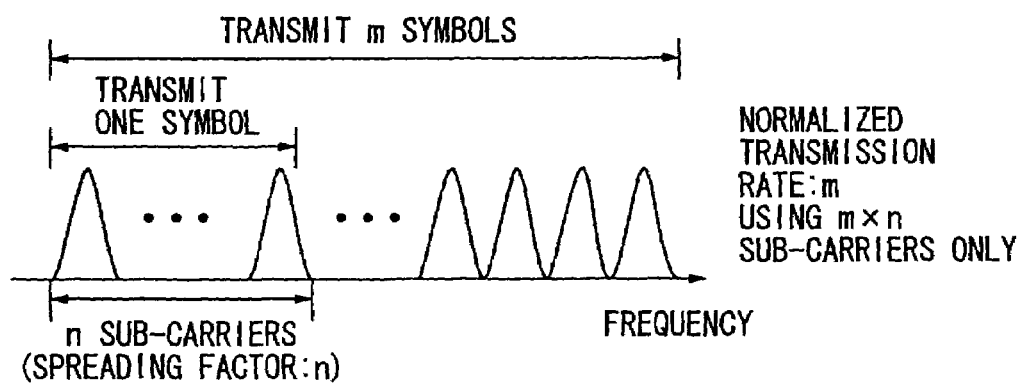

Thus, the spreading factor n is fixed in each of the spreading modulation parts 14'(1) through 14'(m) regardless of the number m of information symbols output in parallel from the serial-to-parallel converting circuit 13. In such a case, the relationship between the transmission rate and the number of sub-carriers assigned for spreading each information symbol is as shown in FIGS. 9A and 9B. Specifically, when m=1, that is, one information symbol is transmitted, as shown in FIG. 9A, the spreading factor of n, and the information symbol is spread into components corresponding to n sub-carriers along the frequency axis. A normalized transmission rate in this case is assumed to be 1. Further, when m information symbols are transmitted simultaneously, as shown in FIG. 9B, the spreading factor is n similarly to the above-mentioned case, and each information symbol is spread into components corresponding to n sub-carriers along the frequency axis. Accordingly, the total number of sub-carriers assigned for spreading m information symbols is a value of n×m. In this case, the normalized transmission rate is m times the above-mentioned normalized transmission rate, and, thus, is m.

In the above-mentioned example, when the transmission rate is to be increased, the number of sub-carriers used for transmitting each information symbol is fixed, and the number of sub-carriers used for transmitting all the information symbols is increased. Conversely, when the transmission rate is to be decreased, the number of sub-carriers used for transmitting each information symbol is fixed, and the number of sub-carriers used for transmitting all the information symbols is decreased. Thus, the transmission rate is in proportion to the number of sub-carriers used for transmitting all the information symbols.

Further, similarly to the case of the above-mentioned first example, sub-carriers to be assigned for spreading each information symbol may be successive along the frequency axis as shown in FIG. 6A, or may be discrete along the frequency axis as shown in FIG. 6B. Further, it is preferable that the spreading codes assigned for respective users are orthogonal to each other, as mentioned above.

Figure 10:
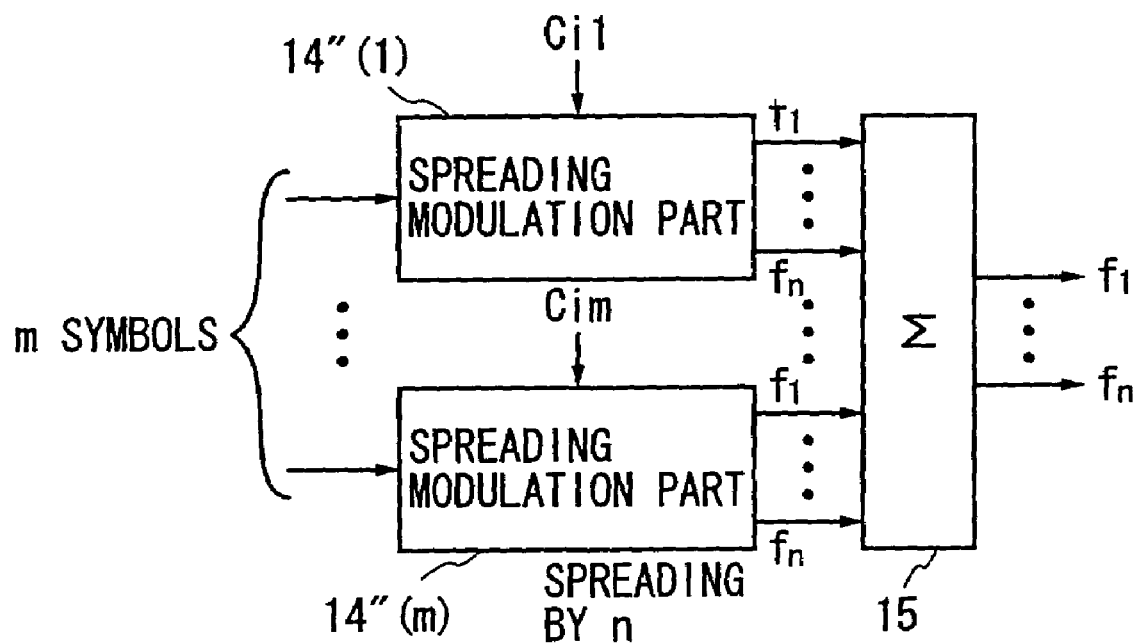
FIG. 10 is a block diagram showing a third example of a configuration for transmission-rate control in the first embodiment of the present invention.

In a third example of specific technique of controlling the transmission rate, as shown in FIG. 10, the spreading modulation parts $14''(1)$ through $14''(m)$ use different spreading codes $Ci1$ through $Cim$, respectively.

As shown in FIG. 10, when m information symbols are output from the serial-to-parallel converting circuit 13 in parallel, each of the spreading modulation parts $14''(1)$ through $14''(m)$, to which a respective one thereof is input, renders a spreading process using a spreading factor of n at any time. Specifically, each input information symbol is replicated by n, and, thus, the information symbols is spread into components corresponding to n sub-carriers along the frequency axis at any time. The spreading processes rendered by the respective spreading modulation parts $14''(1)$ through $14''(m)$ use the spreading codes $Ci1$ through $Cim$ different from each other.

Figure 11A:
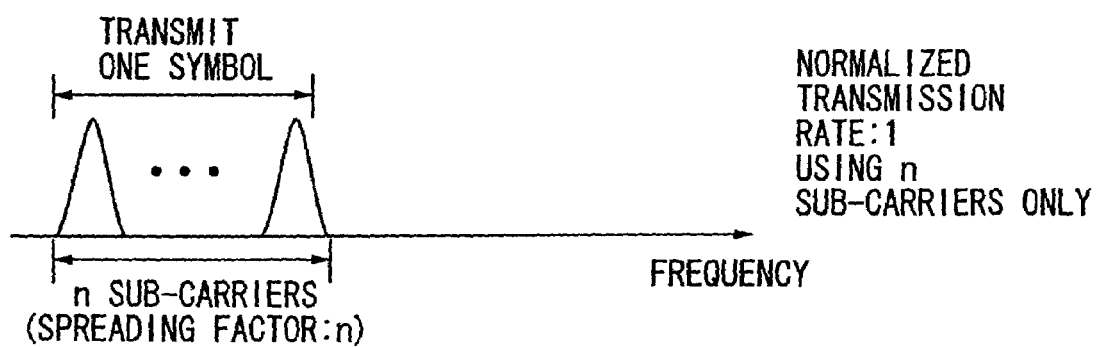
FIGS. 11A and 11B illustrate relationship between the transmission rate and the number of sub-carriers assigned for spreading of each information symbol in the third example shown in FIG. 10.
Figure 11B:
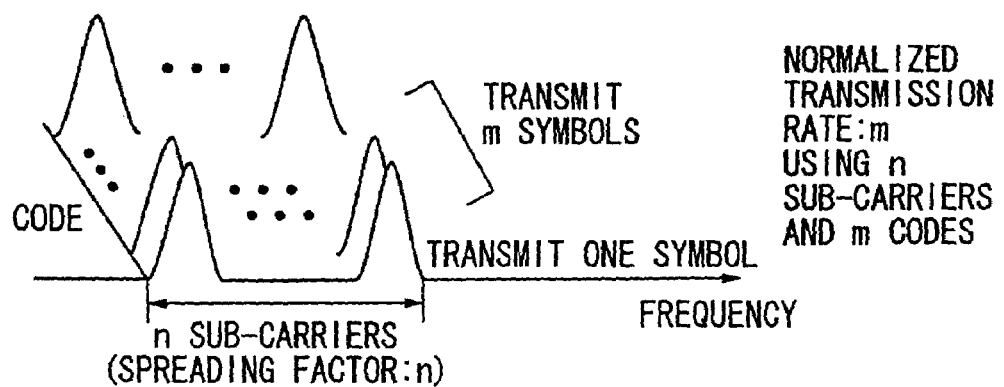

Thus, the m information symbols output in parallel from the serial-to-parallel converting circuit 13 are spread into components corresponding to n sub-carriers along the frequency axis by using different spreading codes $Ci1$ through $Cim$ by the respective spreading modulation parts $14''(1)$ through $14''(m)$. In such a case, relationship between the transmission rate, the number of sub-carriers assigned for each information symbol and the spreading codes used is as shown in FIGS. 11A and 11B. When m=1, that is, one symbol is transmitted, the spreading factor is n, and the symbol is spread into components corresponding to one set of n sub-carriers, as shown in FIG. 11A. In this case, a normalized transmission rate is assumed to be 1. When m symbols are transmitted simultaneously, the spreading factor is n similarly to the above-mentioned case along the frequency axis, however, by m spreading codes, m types of spreading forms along the frequency axis are rendered. In this case, the normalized transmission rate is m times the above-mentioned one, that is, is m.

The spread signals corresponding to the n sub-carriers f1 through fn output from the respective spreading modulation parts $14''(1)$ through $14''(n)$ as mentioned above are combined (for example, added together) by the combining circuit 15 ($\Sigma$) for the components of respective sub-carriers. Then, the combined spread signals having combined components corresponding to the n sub-carriers output from the combining circuit 15 are output as an output signal of the signal generating circuit $100(i)$ for the user (i) (see FIG. 2).

In the above-mentioned example, when the transmission rate is to be increased, the number of spreading codes used for spreading each information symbol is increased. Conversely, when the transmission rate is to be decreased, the number of spreading codes used for spreading each information symbol is decreased.

Further, similarly to the cases of the above-mentioned first and second examples, sub-carriers to be assigned for spreading each information symbol may be successive along the frequency axis as shown in FIG. 6A, or may be discrete along the frequency axis as shown in FIG. 6B. Further, it is preferable that the spreading codes $Ci1$ through $Cim$ assigned for each user (i) are orthogonal to each other, and, also, it is preferable that these spreading codes are orthogonal to each other among the respective users.

A fourth example of technique of controlling the transmission rate will now be described.

In this example, as shown in FIG. 12, an intermittent transmission control part 16 is provided before the serial-to-parallel converting circuit 13 in each of the signal generating circuit $100(1)$ through $100(n)$ shown in FIG. 2. The intermittent transmission control part 16, based on the transmission rate control signal from the control unit (not shown in the figure), controls timing of transfer of transmitting data, having undergone the process by the channel encoder 12 (see FIG. 2), to the serial-to-parallel converting circuit 13. When the transmission rate is to be increased, as shown in FIG. 13A, intervals of data transmission (interval between each adjacent data transmission) are shortened. Conversely, when the transmission rate is to be decreased, the intervals of the data transmission are elongated, as shown in FIG. 13B or 13C. Thus, the information transmission rate is controlled by controlling the intervals of the data transmission.

When the transmitting data, the intervals of transmission of which have been thus controlled by the intermittent transmission control part 16, is input to the serial-to-parallel converting part 13, the transmitting data is thereby converted into the predetermined number m of parallel information symbols, and each of the information symbols is spread into n sub-carriers by a respective one of the spreading modulation parts $14(1)$ through $14(m)$.

A fifth example of specific technique of controlling the transmission rate will now be described.

Figure 14:
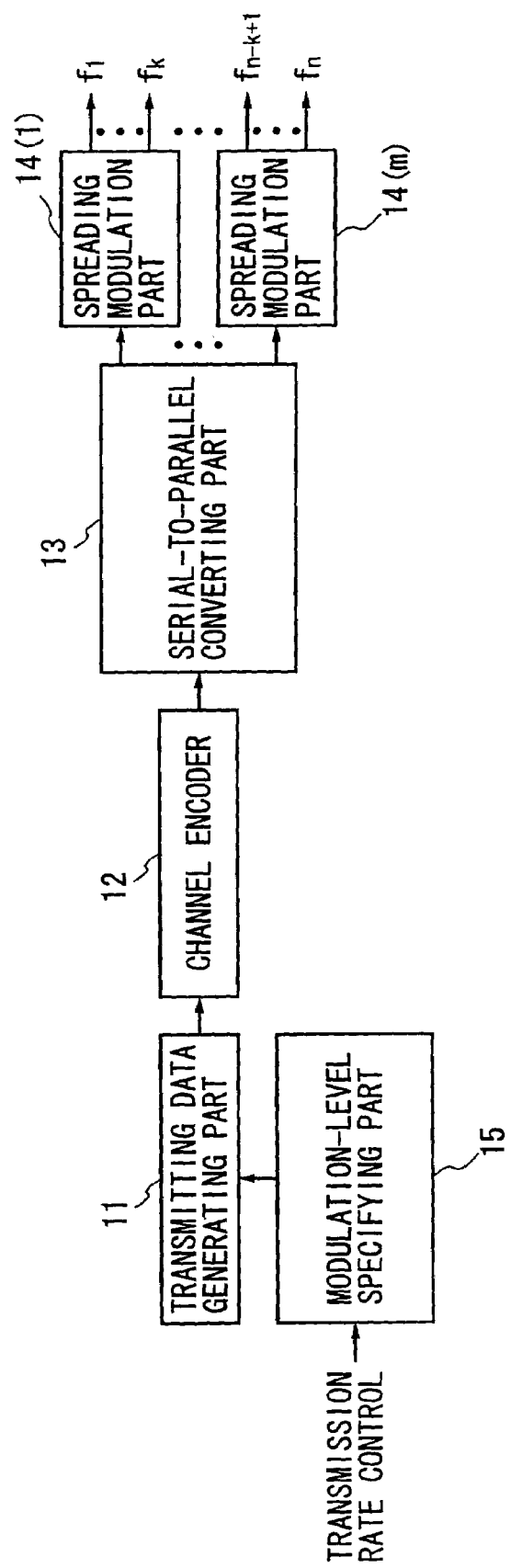
FIG. 14 is a block diagram showing a fifth example of a configuration for transmission-rate control in the first embodiment of the present invention.
Figure 15:
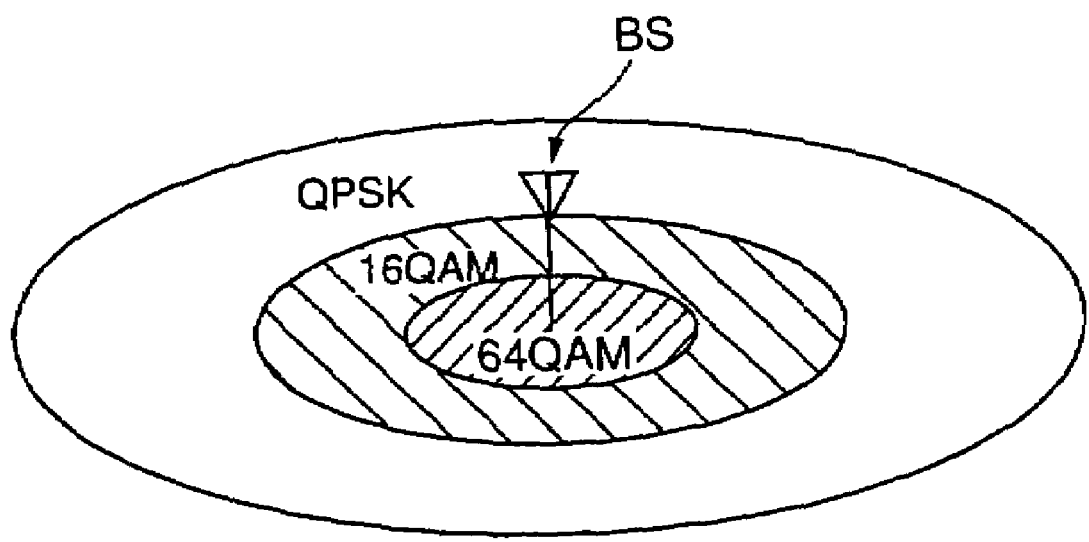
FIG. 15 shows an example of a form of control of the transmission rate in the fifth example shown in FIG. 14.

In this example, as shown in FIG. 14, the number of modulation levels of data modulation by the transmitting data generating part 11 in each of the signal generating parts $100(1)$ through $100(n)$ shown in FIG. 2 is controlled by a modulation level specifying part 15 based on the transmission rate control signal. When the transmission rate is to be increased, the number of modulation levels is increased, that is, for example, modulation of transmitting data is performed in a well-known 16QAM (the number of modulation levels: 16) or 64QAM (64) form. When the transmission rate is to be decreased, the number of modulation levels is decreased, that is, for example, modulation of transmitting data is performed in a well-known QPSK (4) or BPSK (2) form.

This switching of the form of modulation can be made according to environment of radio channel, as shown in FIG.

15. That is, a modulation form having a large number of modulation levels is used for users near to a base station and having satisfactory reception conditions, and a modulation form having a small number of modulation levels is used for users far from the base station and having not satisfactory reception conditions. Further, it is also possible to change the modulation form according to the amount of information to be transmitted. For example, for users who have relatively large amounts of information such as images, information from Internet, and so forth, distributed thereto, a modulation form having a large number of modulation levels is used. For users who have relatively small amounts of information such as audio, and so forth, distributed thereto, a modulation form having a small number of modulation levels is used.

A technique of switching the modulation form (the number of modulation levels) according to the environment of radio channel or the amount of information to be transmitted so as to control the transmission rate may be applied to each of the above-described first through fourth examples of controlling the transmission rate. That is, to users having satisfactory reception conditions or having large amounts of information distributed thereto, information is transmitted at a relatively high transmission rate. To users having not satisfactory reception conditions or having small amounts of information distributed thereto, information is transmitted at a relatively low transmission rate.

Figure 16:
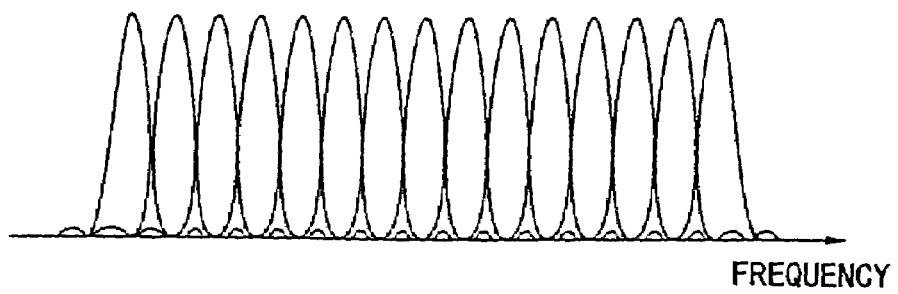
FIGS. 16 and 17 show possible examples of relationship of respective sub-carriers along the frequency axis in the first embodiment of the present invention.

In each of the above-described examples, an IFFT (Inverse Fast Fourier Transformer) or IDFT (Inverse Discrete Fourier Transformer) unit 22 is adjusted so that respective sub-carriers used for the spreading process are orthogonal with each other along the frequency axis as shown in FIG. 16, for example.

Figure 17:
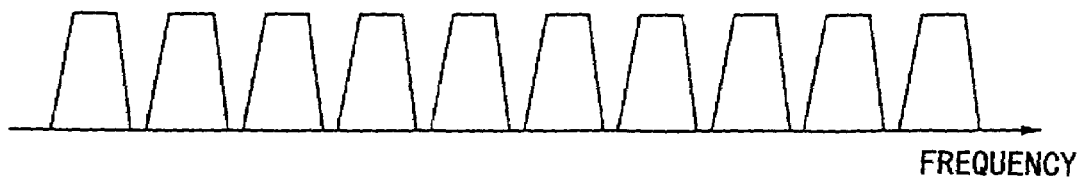

Further, in each of the above-described examples, in order to limit the frequency band for a data component corresponding to each sub-carrier, the waveform of each sub-carrier is shaped as shown in FIG. 17, for example, and, then, is used for data spreading along the frequency axis. Thereby, the frequency characteristics of respective sub-carriers are prevented from overlapping with each other, and, thus, influence of interference between the sub-carriers can be removed.

Further, it is possible to combine any of the respective techniques of the above-described first example, second example, third example, fourth example and fifth example, and control the transmission rate of transmitting information to each user using the thus-combined techniques.

A channel estimation method according to the present invention will now be described based on the drawings.

Figure 18:
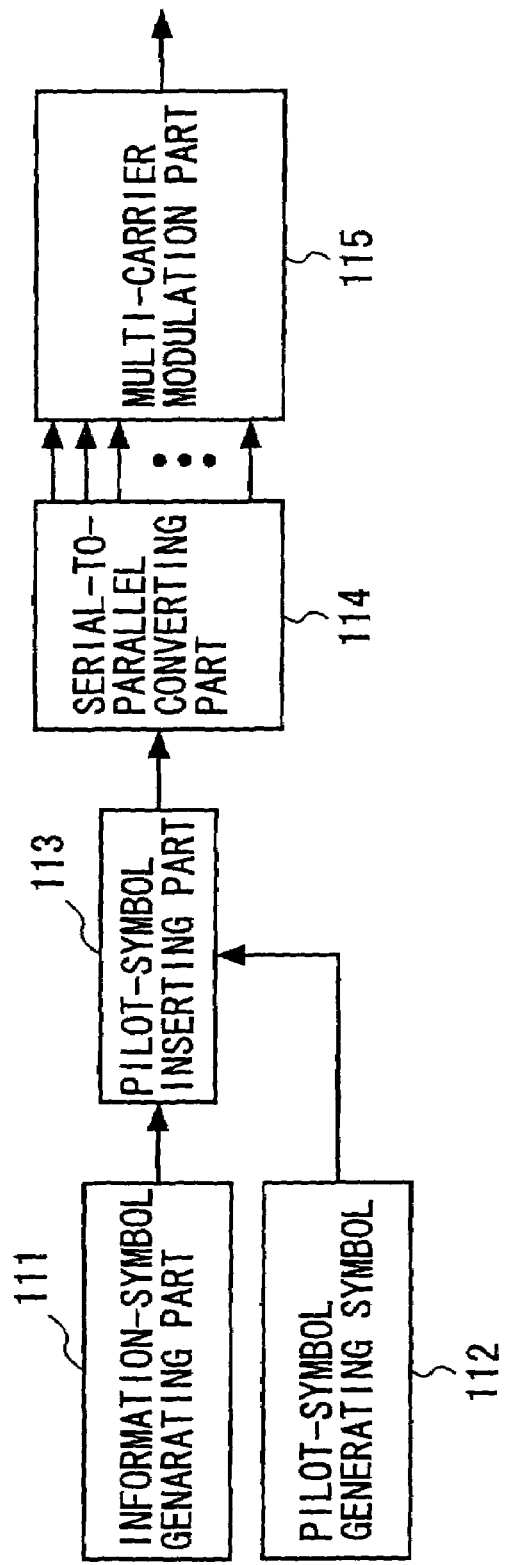
FIG. 18 is a block diagram showing a basic configuration of a transmitting station in a multi-carrier CDMA radio transmitting system to which a channel estimation method in a second embodiment of the present invention is applied.

A transmitting station in a multi-carrier CDMA radio transmitting system to which the channel estimation method in a second embodiment of the present invention is applied is configured as shown in FIG. 18.

As shown in FIG. 18, this transmitting station includes an information-symbol generating part 111, a pilot-symbol generating part 112, a pilot-symbol inserting part 113, a serial-to-parallel converting part 114 and a multi-carrier modulation part 115. The information-symbol generating part 111 generates a series of information symbols obtained through channel coding and interleaving (in a case of OFDM form) or a series of information symbols such as a spread series obtained through spreading using a spreading code faster than the information transmitting rate (in a case of MC-CDMA form). The pilot-symbol generating part 112 generates predetermined pilot symbols, the phase of each of which is already known. The pilot-symbol inserting part 113 combines the information symbols from the information-symbol generating part 111 and pilot-symbols from the pilot-symbol generating part 112 according to a predetermined algorithm.

The serial-to-parallel converting part 114 converts the series of symbols obtained by the pilot-symbol inserting part 113 into a parallel form thereof by dividing the series of symbols every predetermined number of bits. The multi-carrier modulation part 115 uses IFFT (Inverse Fast Fourier Transform) or IDFT (Inverse Discrete Fourier Transform), and renders multi-carrier modulation so that the respective ones of the parallel-output symbol series from the serial-to-parallel converting part 114 are spread into sub-carriers. A signal corresponding to a signal output from the multi-carrier modulation part 115 is transmitted as a transmitting signal by radio.

Figure 19:
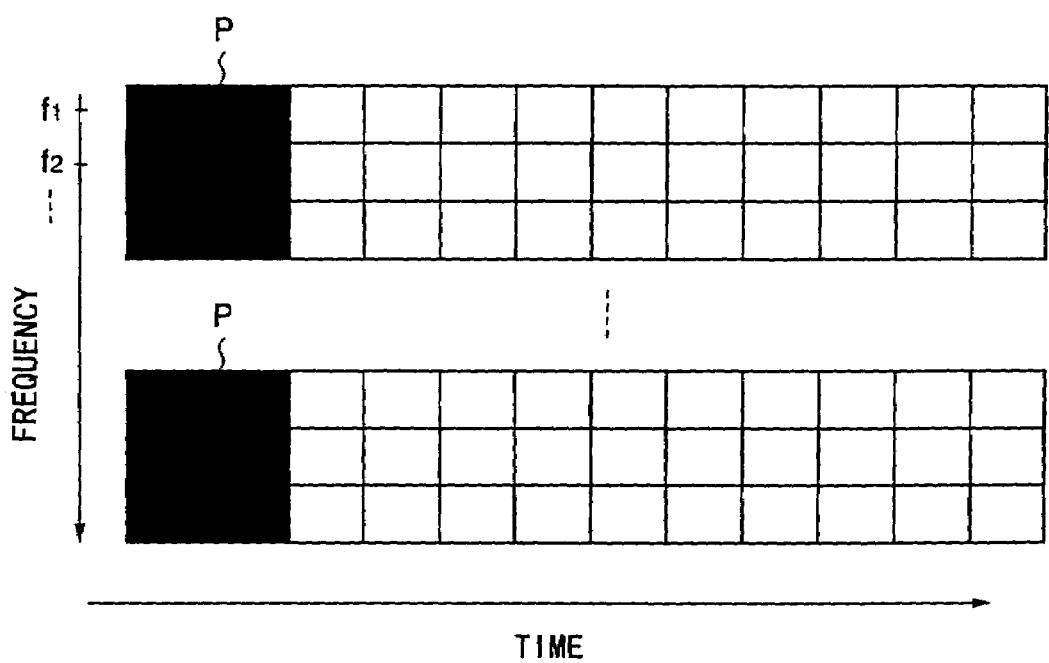
FIG. 19 illustrates a first example of a form of inserting pilot symbols into respective sub-carrier components in the transmitting station shown in FIG. 18.

A frame (packet frame) configuration of the signal output from the multi-carrier modulation part 115 rendering the multi-carrier modulation on the symbol series, in which the information symbols and pilot symbols are combined, is as shown in FIG. 19, for example. In this example, a plurality of pilot symbols P (for example, two symbols) are inserted into each of all the sub-carriers f1 f2, . . . at the same timing (the top of the frame).

Figure 20:
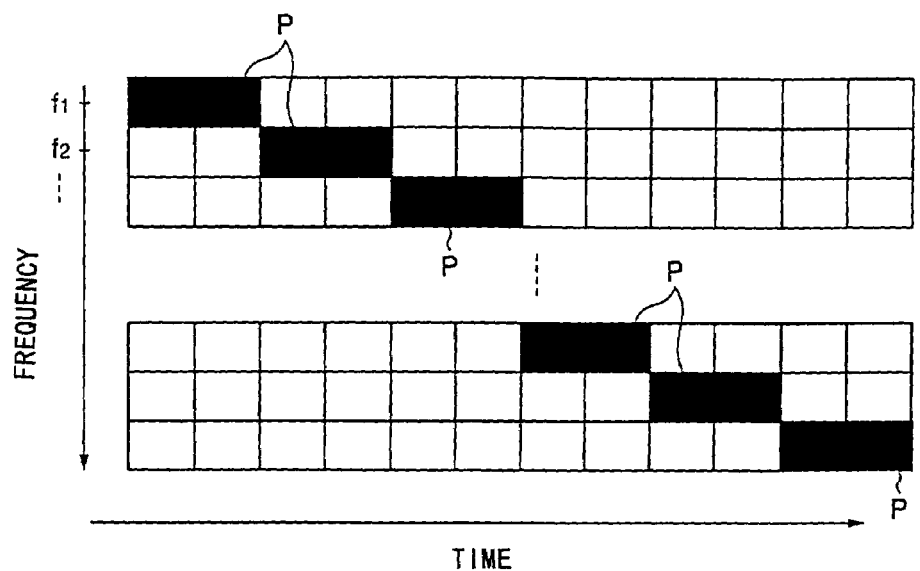
FIG. 20 illustrates a second example of a form of inserting pilot symbols into respective sub-carrier components in the transmitting station shown in FIG. 18.

Alternatively, it is also possible to have a frame configuration shown in FIG. 20. In this example, a plurality of pilot symbols P (for example, two symbols) are inserted into each of all the sub-carriers f1 f2, . . . at different timings.

In each of the examples shown in FIGS. 19 and 20, chips obtained through spreading of actual pilot symbols correspond to the above-mentioned pilot symbols, in the radio transmitting system in the MC-CDMA form.

Figure 21:
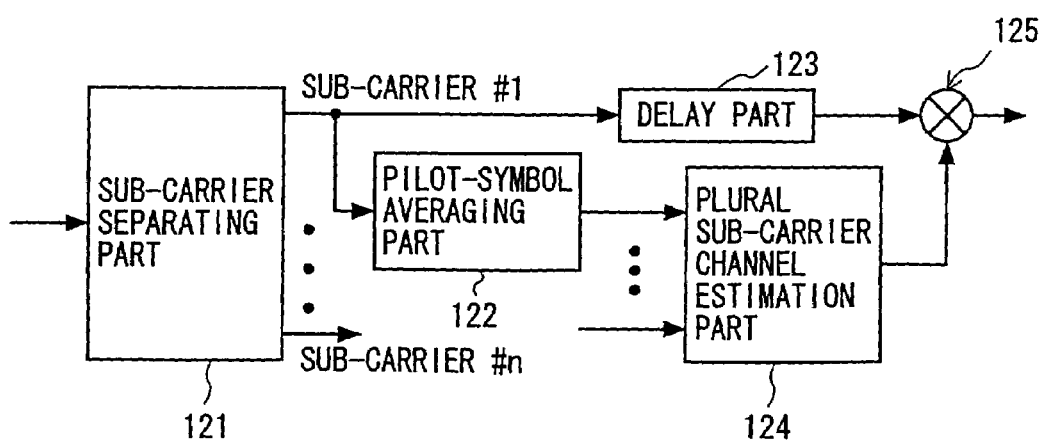
FIG. 21 is a block diagram showing an example of a configuration of a demodulating apparatus in which channel estimation according to the channel estimation method in the second embodiment of the present invention is rendered.

A demodulating apparatus provided in a receiving station of the above-mentioned multi-carrier radio transmitting system is configured as shown in FIG. 21, for example.

As shown in FIG. 21, the demodulating apparatus includes a sub-carrier separating part 121, a pilot-symbol averaging part 122 provided for each sub-carrier component from the sub-carrier separating part 121, a delay part 123 and a compensating part 125, and a channel estimation part 124. The sub-carrier separating part 121 has a function of FFT (Fast Fourier Transform) or DFT (Discrete Fourier Transform), and separates a received signal received from a transmitting station having the configuration described above with reference FIG. 18 into respective sub-carrier components #1, . . . , #n. Each pilot-symbol averaging part 122 extracts a plurality of pilot symbols (see FIGS. 19 and 20) included in a respective one of the sub-carrier components, averages respective channel estimation values obtained from these pilot symbols, and thus obtains a channel estimation value for the relevant sub-carrier (this channel estimation value will be referred to as an individual channel estimation value, hereinafter).

The channel estimation part 124 combines the individual channel estimation values obtained from the pilot-symbol averaging parts 122 corresponding to a plurality of successive sub-carriers along the frequency axis including the sub-carrier i, and obtains a final channel estimation value for the relevant sub-carrier i. A detailed configuration of this channel estimation part 124 will be described later.

Each sub-carrier component output from the sub-carrier separating part 121 is also provided to the compensating part 125 after delayed by the delay part 123 configured in consideration of a time required for the processes (processes rendered by the pilot-symbol averaging part 122 and channel estimation part 124). Then, the compensating part 125 uses the channel estimation value for the sub-carrier i obtained by the channel estimation part 124 as mentioned above, and compensates a channel variation for the information symbols of the component of the sub-carrier i. The information symbols thus obtained through the compensation of the channel variation by the compensating part 125 are then made to undergo a predetermined demodulation process including absolute synchronizing detection, in the radio transmitting system in the OFDM form, but are further made to undergo an inverse spreading process and then are made to undergo the predetermined demodulation process including absolute synchronizing detection, in the radio transmitting system in the MC-CDMA form.

Figure 22:
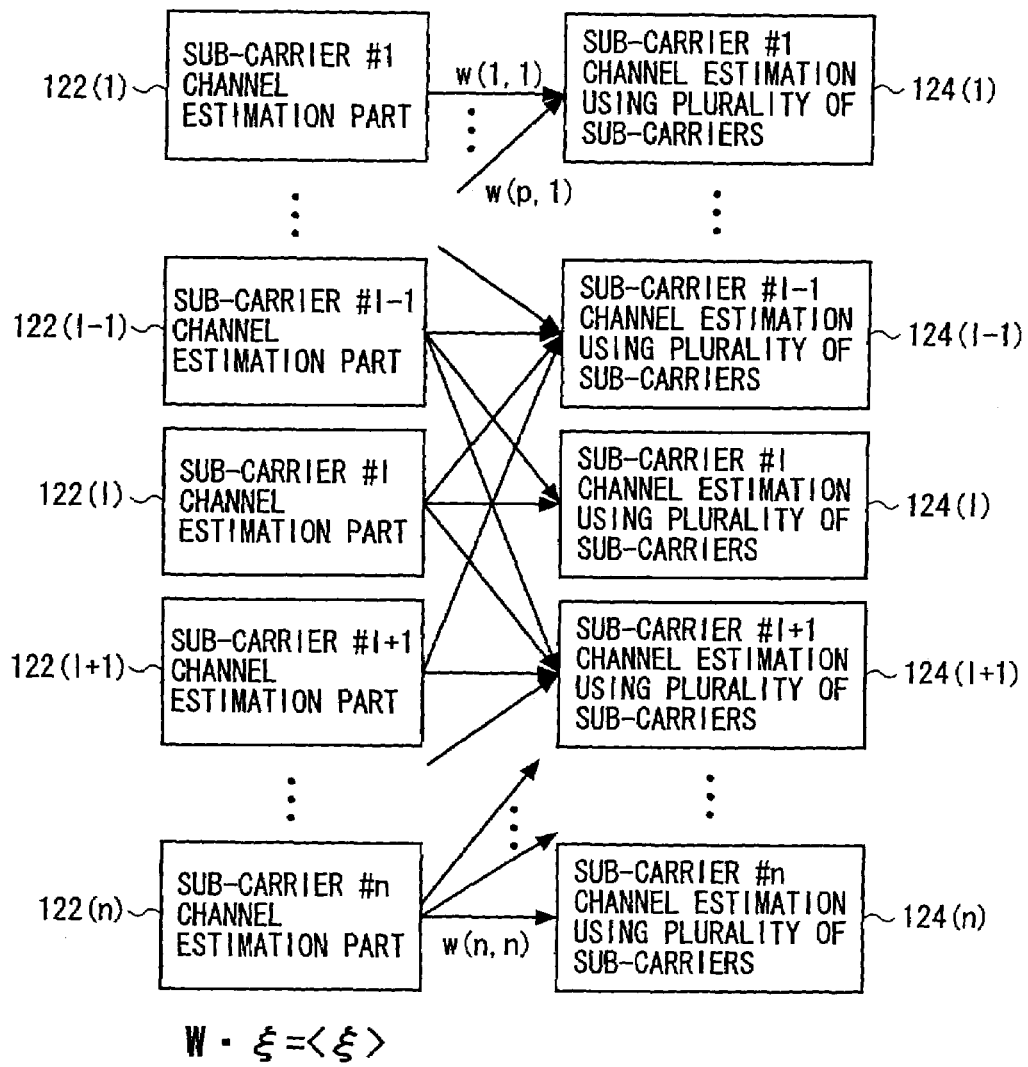
FIG. 22 is a block diagram showing a specific example of a configuration of a channel estimation part shown in FIG. 21.

The channel estimation part 124 is configured as shown in FIG. 22, for example.

This channel estimation part 124 includes a channel estimation units 124(1), 124(2), . . . , 124(n) corresponding to the n sub-carriers. The channel estimation unit 124(i) corresponding to the sub-carrier i obtains the final channel estimation value for the relevant sub-carrier i by multiplying the individual channel estimation values obtained by the pilot-symbol averaging parts 122 corresponding to respective p sub-carriers successive along the frequency axis including the sub-carrier i by predetermined weighting values. Specifically, assuming that a weighting coefficient vector expressing the weighting values is W, and the individual channel estimation values are $\xi$, the final channel estimation values $<\xi>$ are calculated using the following formula:

$$<\xi> = W \cdot \xi$$

There, the weighting vector W is expressed by the following matrix:

$$W = \begin{bmatrix} w(0,0) & & & & 0 \\ & w(l-1,l-1) & w(l,l-1) & w(l+1,l-1) & \\ & w(l-1,l) & w(l,l) & w(l+1,l) & \\ & w(l-1,l+1) & w(l,l+1) & w(l+1,l+1) & \\ 0 & & & & w(n,n) \end{bmatrix}$$

and, the individual channel estimation values $\xi$ are expressed by the following matrix:

$$\xi = \begin{bmatrix} \xi 1 \\ \xi n \end{bmatrix}$$

Further, the final channel estimation values $<\xi>$ are expressed by the following matrix:

$$<\xi> = \begin{bmatrix} <\xi 1> \\ <\xi n> \end{bmatrix}$$

The element w(j, i) of the weighting coefficient vector W is determined based on mutual correlation between channel states for respective sub-carriers (j and i) expected from a frequency difference between the sub-carriers (j and i). Then, the element w(j, i) is the weighting value used for estimating the channel estimation value $<\xi i>$ for the i-th sub-carrier (i) from the individual channel estimation value $\xi j$ of the j-th sub-carrier (j) depending on the channel state for this j-th sub-carrier (j). Accordingly, in general, this element w(j, i) has a smaller value as the sub-carrier (j) is apart farther from the sub-carrier (i) (the mutual correlation becomes smaller), and, it becomes zero as the sub-carriers apart from one another by a predetermined number of sub-carriers (for example, the sub-carrier (j) is out of the range of p sub-carriers including the sub-carrier (i) at the center thereof).

By the channel estimation for each sub-carrier in the above-described demodulating apparatus, the channel estimation value $<\xi i>$ for each sub-carrier (i) is determined in consideration of (taking into account) the individual channel estimation values $\xi$ of respective sub-carriers reflecting the states of radio charnels for these plurality of sub-carriers (p sub-carriers). The degree of this consideration (taking into account) is expressed as the weighting value w(j, i).

Accordingly, the channel estimation value for each sub-carrier is determined based on the channel states of plurality of sub-carriers including the relevant sub-carrier. As a result, it is possible to render high-accuracy channel estimation even in a situation in which the states of radio channels vary variously.

In the above-mentioned example, the weighting coefficient vector W used for calculating the channel estimation value $<\xi>$ for each sub-carrier in the channel estimation part 124 is determined fixedly based on the mutual correlation of the states of radio channels expected based on respective sub-carriers. However, the mutual correlation of respective sub-carriers may vary depending on the states of radio channels which vary variously. Accordingly, it is preferable to change the above-mentioned weighting coefficient vector W adaptively based on the states of the radio channels.

A specific example of thus controlling the above-mentioned weighting coefficient vector based on the states of the radio channels will now be described.

Figure 23:
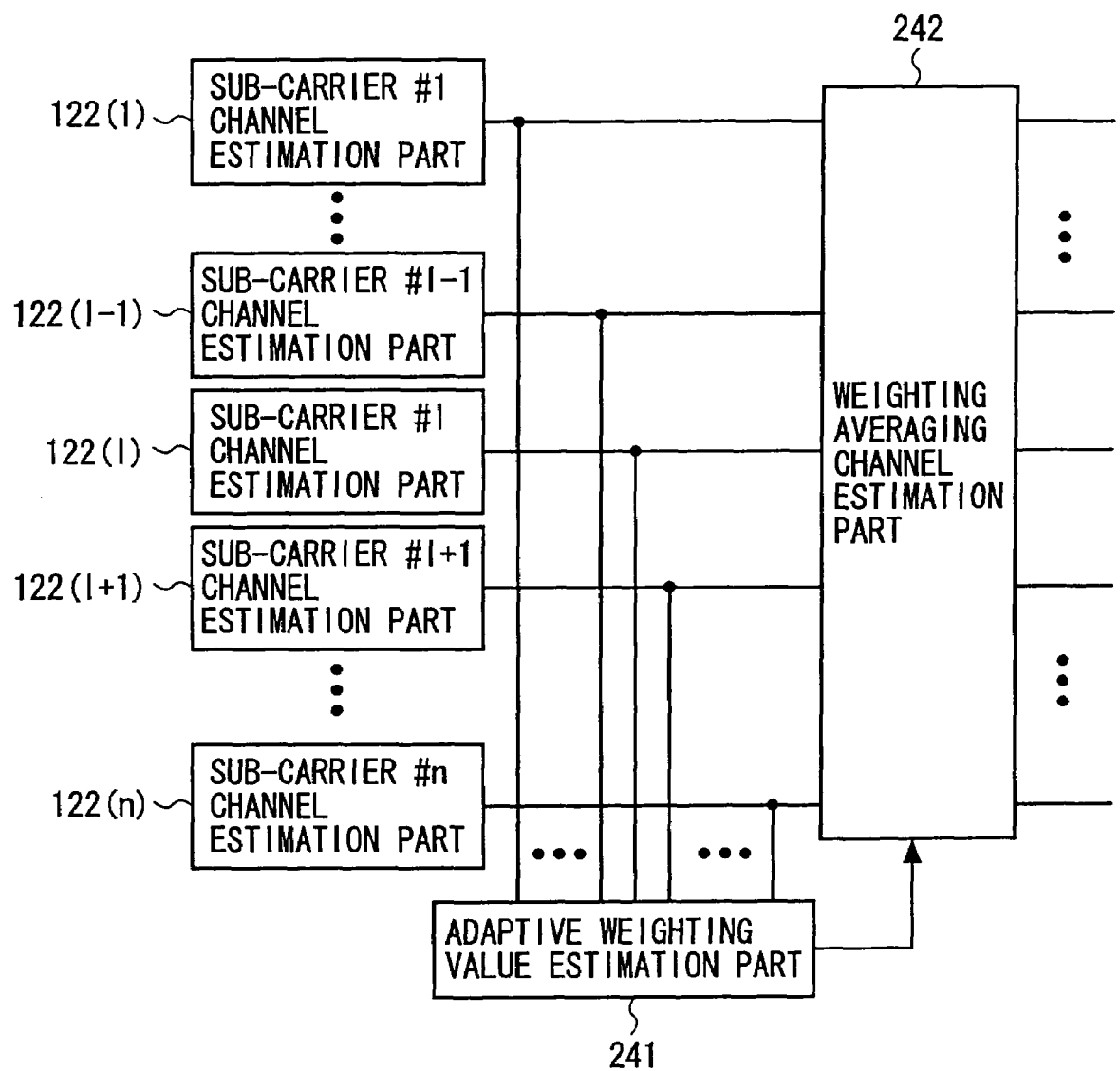
FIG. 23 is a block diagram showing another specific example of a configuration of the channel estimation part shown in FIG. 21.

The above-mentioned channel estimation part 124 is configured as shown in FIG. 23.

As shown in FIG. 23, this channel estimation part 124 includes an adaptive weighting value estimation part 241 and a weighting averaging channel estimation part 242. The adaptive weighting value estimation part 124 adaptively obtains each weighting value (of the weighting coefficient vector W) described above using a technique of MMSE (Minimum Mean Square Error), for example, based on the individual channel estimation values from the averaging channel estimation parts 122(1), 122(2), . . . , 122(n) corresponding to respective sub-carriers. Then, the weighting averaging channel estimation part 242 uses the weighting coefficient vector W obtained by the above-mentioned adaptive weighting value estimation part 241, combines the respective individual channel estimation values from the respective averaging channel estimation parts 122(1), 122(2), . . . , 122(n), and, thus, renders weighting combining according to the frequency response characteristics of channels (channel states).

Further, it is also possible to configure the above-mentioned adaptive weighting value estimation part 241 as shown in FIG. 24, for example.

As shown in FIG. 24, the adaptive weighting value estimation part 241 includes a correlation measuring part 243 which calculates the mutual correlation between the channel states for the respective sub-carriers, from the individual channel estimation values corresponding to the respective sub-carriers. Then, the weighting value w(j, i) is obtained based on the mutual correlation value r(j, i) between the channel states for the respective sub-carriers obtained by this correlation measuring part 243.

The above-mentioned correlation measuring part 232 calculates the inner product of the individual channel estimation values from the averaging channel estimation parts 122(i) and 122(j) corresponding to the two sub-carriers, and determines the thus-calculated inner product as the mutual correlation value r(j, i). This mutual correlation value r(j, i) indicates a degree of correlation of the channel state for the sub-carrier j from the channel state for the sub-carrier i. This mutual correlation value r(j, i) has the maximum value when the individual channel estimation value (phase) obtained by the averaging channel estimation part 122(j) is same as the individual channel estimation value (phase) obtained by the averaging channel estimation part 122(i), and the mutual correlation value r(j, i) is zero when the difference (phase difference) therebetween is 90 degrees.

By configuring the weighting value estimation part 241 as described above, it is possible to control the above-mentioned weighting coefficient vector adaptively based on the mutual correlation between the channel states for the respective sub-carriers. Then, the weighting coefficients of the weighting coefficient vector adaptively controlled based on the channel states for the respective sub-carriers are provided to each channel estimation unit 124(*i*) shown in FIG. 22. As a result, it is possible to obtain the channel estimation value for each sub-carrier based on the channel states for the plurality of sub-carriers.

By using the channel estimation method in each of the above-described examples, it is possible to render efficiently, high-accuracy channel estimation adaptive to the channel states. Then, by rendering the absolute synchronizing detection using the thus-obtained channel estimation values, it is possible to reduce the ratio of signal power to interference power (SIR) so as to reduce the reception error rate and to obtain a desired reception quality. Thereby, it is possible to increase the subscriber capacity of the radio transmitting system.

In each of the above-mentioned examples of channel estimation methods, the pilot symbols are included in all the n sub-carrier components. However, a channel estimation method according to the present invention is not limited to such a configuration, and it is also possible to include pilot symbols only into some of the sub-carrier components (for m sub-carriers (m<n)) disposed discretely along the frequency axis. In such a case, channel estimation for sub-carrier components including no pilot symbols is rendered based on the individual channel estimation values obtained for other plurality of sub-carriers.

The present invention is not limited to the above-described embodiments, and variations and modifications may be made without departing from the scope of the present invention.

The present application is based on Japanese priority applications Nos. 2000-46624 and 2000-81050, filed on Feb. 23, 2000 and Mar. 22, 2000, respectively, the entire contents of which are hereby incorporated by reference.

What is claimed is:

1. A channel estimation method used for a multi-carrier radio transmitting system rendering radio transmission using n sub-carriers, for rendering channel estimation for each sub-carrier, comprising the steps of:

a) separating a received signal having a frame configuration comprising the n sub-carrier components including m sub-carrier components into which pilot symbols are inserted, into the respective sub-carrier components, where $m \leq n$;

b) using the pilot symbols included in the sub-carrier components obtained through the separation, and rendering channel estimation so as to obtain individual channel estimation results for the respective n sub-carriers; and c) rendering the channel estimation for each target sub-carrier based on the individual channel estimation results for p sub-carriers of the thus-obtained individual channel estimation results for the respective n sub-carriers and relationship between a channel state for the target sub-carrier and a channel state for each of the p sub-carriers, where $p \leq m$.

2. The method as claimed in claim 1, wherein the relationship between the channel state for the target sub-carrier and the channel state for each of the p sub-carriers is obtained adaptively based on the respective channel states.

3. The method as claimed in claim 1, wherein:

weighting information is obtained based on the relationship between the channel state for the target sub-carrier and the channel state for each of the p sub-carriers; and the individual channel estimation results for the respective p sub-carriers are weighted by the weighting information and are then combined so as to obtain the channel estimation result for the target sub-carrier.

4. The method as claimed in claim 3, wherein the weighting information is obtained based on mutual correlation obtained based on the individual channel estimation result obtained for the target sub-carrier and the individual channel estimation result obtained for each of the p sub-carriers.

5. A channel estimation apparatus used for a multi-carrier radio transmitting system rendering radio transmission using n sub-carriers, for rendering channel estimation for each sub-carrier, comprising:

a sub-carrier separating part separating a received signal having a frame configuration comprising the n sub-carrier components including m sub-carrier components into which pilot symbols are inserted, into the respective sub-carrier components, where $m \leq n$;

an individual channel estimation part using the pilot symbols included in the sub-carrier components obtained by the sub-carrier separating part, and rendering channel estimation so as to obtain individual channel estimation results for the respective n sub-carriers; and a channel estimation part rendering the channel estimation for the target sub-carrier based on the individual channel estimation results for p sub-carriers of the thus-obtained individual channel estimation results for the respective n sub-carriers and relationship between a channel state for the target sub-carrier and a channel state for each of the p sub-carriers, where $p \leq m$.

6. The apparatus as claimed in claim 5, wherein said channel estimation part comprises a part adaptively obtaining the relationship between the channel state for the target sub-carrier and the channel state for each of the p sub-carriers based on the respective channel states.

7. The apparatus as claimed in claim 5, wherein said channel estimation part comprises:

a weighting information estimation part obtaining weighting information based on the relationship between the channel state for the target sub-carrier and the channel state for each of the p sub-carriers; and a weighting channel estimation part obtaining the channel estimation result for the target sub-carrier by weighting the individual channel estimation results for the respective p sub-carriers by the weighting information and then combining them.

8. The apparatus as claimed in claim 7, wherein:

said weighting information estimation part comprises a correlation measuring part obtaining a mutual correlation value based on the individual channel estimation result obtained for the target sub-carrier and the individual channel estimation result obtained for each of the p sub-carriers; and obtains the weighting information based on the mutual correlation value obtained by said correlation measuring part.

\* \* \* \* \*